May 22, 1951     T. M. DINES     2,553,849
TIRE CHAIN
Filed April 30, 1948     3 Sheets-Sheet 1
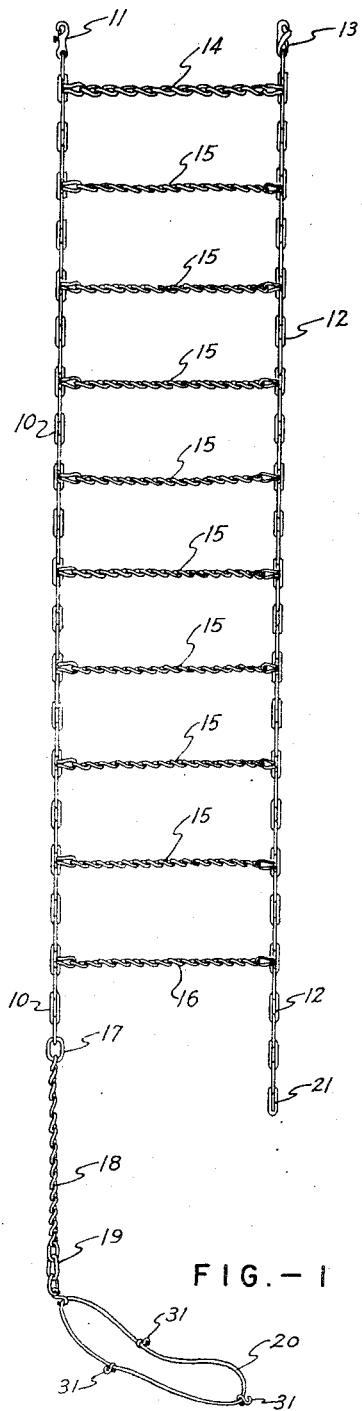
FIG.—1
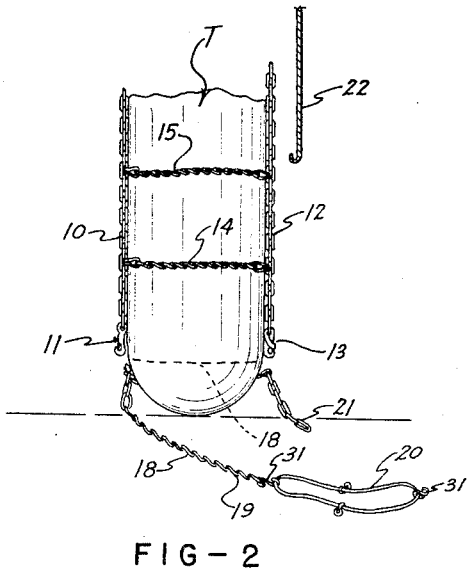
FIG—2
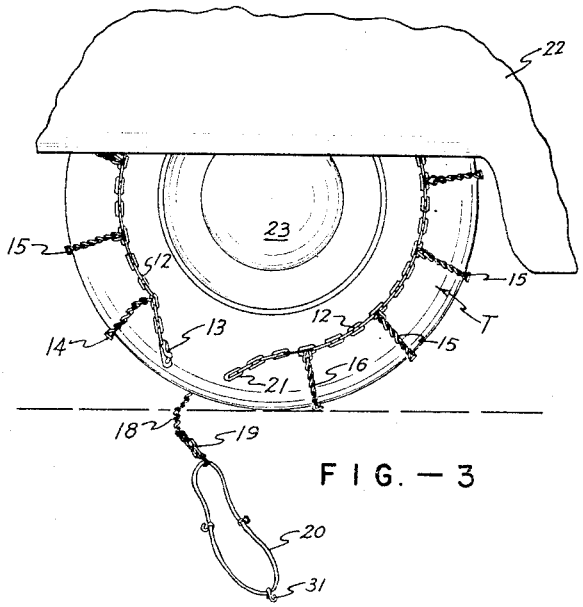
FIG.—3
INVENTOR.
Thomas M. Dines
BY
Lamphere & Van Valkenburgh
ATTORNEYS May 22, 1951 T. M. DINES 2,553,849
TIRE CHAIN
Filed April 30, 1948 3 Sheets-Sheet 2
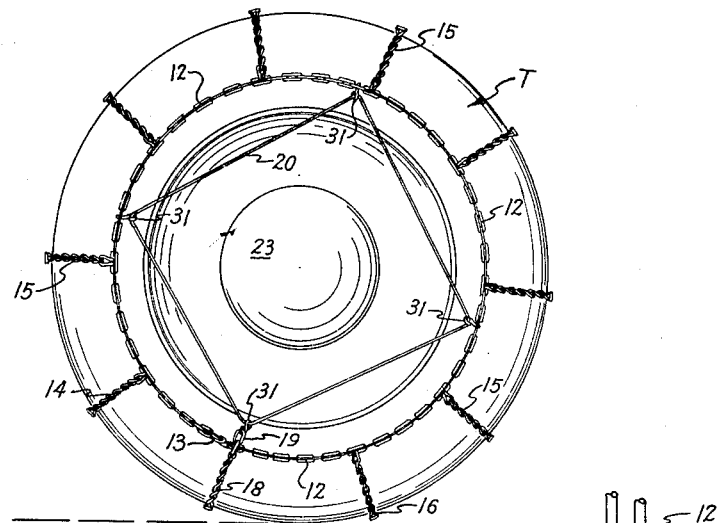
FIG.—4
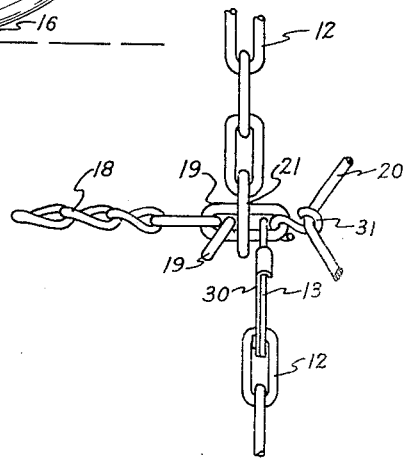
FIG.—6
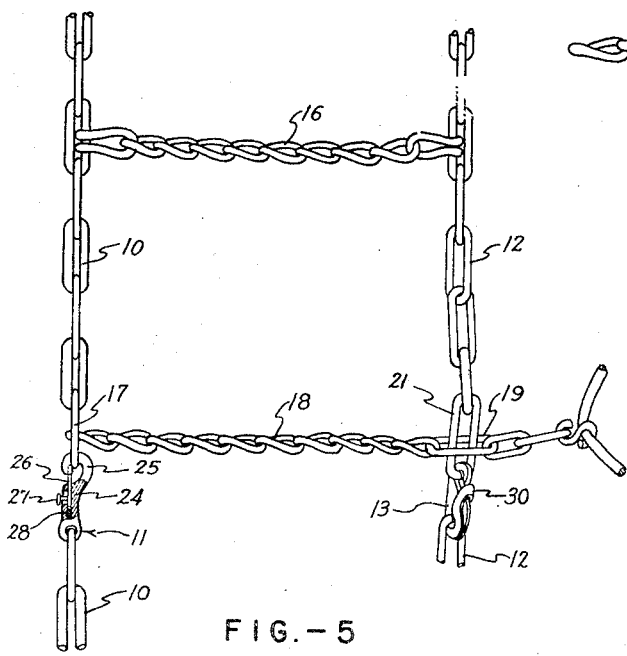
FIG.—5
INVENTOR.
Thomas M. Dines
BY
Lamphere & Van Valkenburgh
ATTORNEYS May 22, 1951  T. M. DINES  2,553,849
TIRE CHAIN
Filed April 30, 1948  3 Sheets-Sheet 3
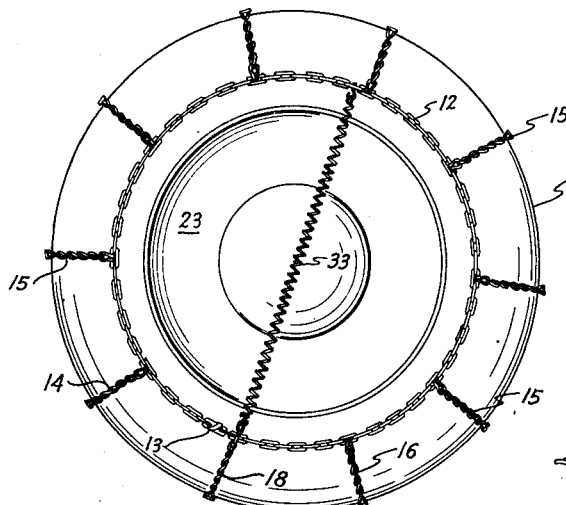
FIG.—8
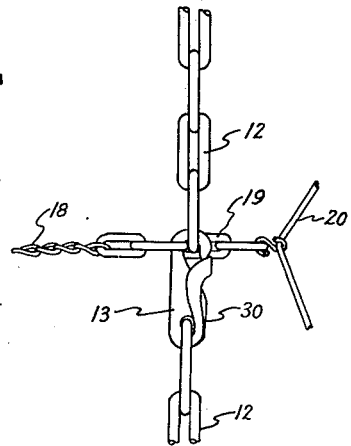
FIG.—7
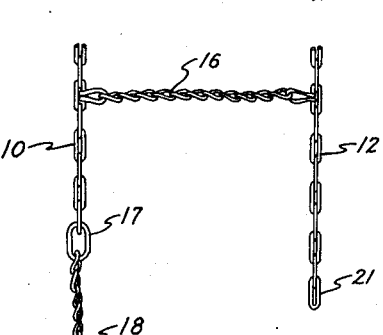
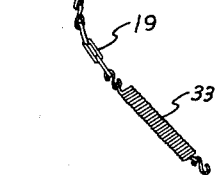
FIG.—9
INVENTOR.
Thomas M. Dines
BY
Lamphere & Van Valkenburgh
ATTORNEYS Patented May 22, 1951

2,553,849

UNITED STATES PATENT OFFICE 2,553,849

TIRE CHAIN

Thomas M. Dines, Denver, Colo.

Application April 30, 1948, Serial No. 24,175

8 Claims. (Cl. 152—241)

This invention relates to tire chains, such as used on passenger automobiles, light trucks and the like.

Present tire chains, generally in use, include an inner side chain, an outer side chain, and cross links extending therebetween. One end of each side chain is provided with a suitable hook, for attachment to the opposite end thereof, when the chain encircles the tire, with the cross links extending around the tread thereof. In mounting such previous types of tire chains on a tire, the task is rendered unnecessarily difficult and disagreeable, due to the necessity for crawling under or partly under the automobile in order to fasten the inside hook, due to its relatively inaccessible position. Also, it has been virtually impossible to take up a sufficient amount of slack to enable the chains to fit reasonably tightly, without either jacking up or similarly lifting the tire off the ground, or by running the automobile forwardly or backwardly onto the chain, which is laid out on the ground. The former involves considerable time and trouble, while the latter usually requires considerable skill and judgment on the part of the driver of the car, and often is impossible when the tire on which the chain is to be mounted is slipping in mud, on ice or snow, or the like. Also, with fenders or fender skirts becoming lower and lower, the difficulty and disagreeability of mounting tire chains, particularly on rear wheels, has become more and more acute.

Among the objects of the present invention are to provide a novel tire chain; to provide a tire chain which is more readily mounted on a tire; to provide a tire chain which is readily mounted on a tire without the necessity for jacking or otherwise lifting the tire off the ground, or of moving the automobile or the like over the chain, when the latter is laid out on the ground; to provide a tire chain whereby sufficient slack may be taken out of the chain without lifting or moving the wheel on which the tire is mounted; to provide a tire chain which does not require the user to crawl partially under the automobile, or fumble with a fastening hook in a relatively inaccessible position; to provide a tire chain which may be mounted on or taken off the tire while the user remains alongside of, but outside the tire, and which requires only that one hand be reached to the inside of the tire, in a relatively accessible position adjacent the ground; and to provide such a tire chain which is readily constructed, and is effective and relatively long wearing in use.

The above and additional objects of this invention, together with the novel features thereof, will become apparent from the following description, taken in connection with the accompanying drawings, in which:

Fig. 1 is a plan view of a tire chain constructed in accordance with this invention, shown in extended position;

Fig. 2 is an end elevation, showing the lower half of a tire on which the chain of this invention is being installed, with a portion of the chain shown in perspective and illustrating one step in the mounting of the chain on the tire;

Fig. 3 is a side elevation of a tire and a portion of an automobile fender, with a portion of the chain in perspective and in the position on the tire occupied during a subsequent step;

Fig. 4 is a side elevation of a tire and wheel on which the chain of Fig. 1 has been mounted;

Fig. 5 is an enlarged plan view of a portion of the chain, illustrating certain connections made in the chain;

Fig. 6 is a plan view of a portion of a chain, illustrating a connection alternative to that of Fig. 5;

Fig. 7 is a plan view of a portion of the chain similar to Fig. 6, but illustrating a further alternative connection;

Fig. 8 is a side elevation, similar to Fig. 4, illustrating an alternative embodiment of the chain of this invention; and Fig. 9 is a condensed plan view, similar to Fig. 1, of the alternative embodiment of Fig. 8.

A tire chain constructed in accordance with this invention, as shown in Fig. 1, is adapted to be installed on a tire T of Figs. 2 to 4, inclusive, and comprises an inner side chain 10 provided at one end with a hook 11, an outer side chain 12 provided at a corresponding end with a hook 13, and a series of cross links connecting the same, such cross links including a cross link 14 adjacent the hooks 11 and 13, intermediate cross links 15, and a cross link 16 at the opposite end. As will be evident, the side chains are formed from flat links, while the cross chains are formed from twisted links produced from material having a larger cross-section, or otherwise more resistant to wear than the side chain links. The inner side chain 10 is provided, at the end opposite hook 11, with an extension which includes a preferably larger link 17, a series of links 18, of the same type as those of the cross links 14, 15 and 16, one or more links 19, preferably at least two, such as three, as shown, of the same type as the side chain links, and a spreader 20 comprising a resilient rubber ring, or similar means adapted to act as a spreader on the outside of the wheel.

Due to the presence of the fender and/or skirt 22, it is normally a difficult task to reach the inside of the wheel or tire in order to fasten an inside hook, but by use of the extension on the end of the inner side chain, and particularly the resilient rubber ring or other spreading means 20, the chain may be readily placed over the top of the tire T, mounted on a wheel 23 of Fig. 3, and the spreader 20 slipped around the bottom of the wheel on the inside and grasped at the opposite edge of the wheel. By pulling on the end links 21 of the outer side chain, and simultaneously on the spreader 20, the chain may be pulled to a position in which the cross link 16, as in Fig. 3, is disposed as closely adjacent the ground as possible. Then, as in Fig. 2, the extension of the inner side chain may be pulled by means of the spreader 20 slightly upwardly and across the tire. In this position, it is necessary only to reach with one hand around the tire and attach the hook 11 to the most readily accessible link of the inner side chain, which will usually be the larger link 17. The hook 11 may be of a type which is easily fastened and unfastened, such as shown in greater detail in Fig. 5, having a body 24 terminating in a hook section 25 and provided with a longitudinally slidable pin 26, adapted to close the hooking space. The pin 26 may be moved by a thumb piece 27, being normally maintained in closed position by a spring 28. When such a hook is used, it is preferably made of relatively strong material, such as forged steel, and is relatively heavy, since considerable stress is placed thereon.

When the inner side chain has been fastened, the extension thereof may be pulled outwardly by the spreader 20, as shown in Fig. 3, and then pulled across the tire T, as to the dotted position of Fig. 2, and then upwardly on the outside, so that the series of links 18 will form the last cross link. The appropriate end link 21 of the outer side chain may be passed through one of the links 19, as illustrated in Fig. 5, and the outer side chain hook 13 fastened to the link 21. The hook 13 may be of a more usual type, such as provided with a locking arm 30. The mounting of the chain is completed by attaching the spreader hooks 31 to the desired links of the outer side chain 12, as in Fig. 4, it being observed that a positive connection is made between the last cross link and the outer side chain, so that if the spreader 20 should break, the last link will not become loose.

In removing the tire chain of this invention, the spreader 20 may be disconnected, the outer side chain 12 unhooked, and the spreader 20 pulled with one hand while the hook 11 is disconnected with the other hand. Preferably, the automobile is stopped with the chain in the position of Fig. 4 for removal.

Instead of passing the link 21 through one of the links 19, the extension of the inner side chain (which provides the last cross link) and the outer side chain may be connected together vice versa, as shown in Fig. 6. Thus, the spreader hook 31 may be disconnected and one of the links 19 passed through an end link 21 of the outer side chain, after which the spreader hook 31 may be connected and the outer side chain hook 13 attached to the link 19. One of the links 19 may be dropped, as shown, and a link 21 may also be dropped in the same way, if desired, as when hooking the outer side chain in the manner shown in Fig. 5. Or, as in Fig. 7, the hook 13 may be passed through both link 21 and link 19. In the latter instance, the hook 13 may be made longer, so as to accommodate two links.

Instead of a resilient rubber ring, as in Figs. 1–7, the spreader may comprise a spring 33, as in Figs. 8 and 9, the use and function of the spring 33 being similar to that of the rubber ring spreader. Also, a snap hook 11′, having a leaf spring 34, or any other desired form of hook, may be provided on the inner side chain. The remaining parts of the chain may be similar to corresponding parts of the chain of Fig. 1, as indicated. The chain of Figs. 8 and 9 may be mounted, and also removed, in substantially the same manner as described previously.

From the foregoing, it will be apparent that the tire chain of this invention fulfills to a marked degree the requirements and objects hereinbefore set forth. The incorporation of the last cross link in an extension of the inner side chain permits the cross link 16 to be placed close to the ground, while the ability of the inner chain to be pulled slightly upwardly by means of the extension, as more particularly by the spreader 20 or 33, enables the inside hook to be readily attached, even though on the inside of the tire and adjacent the ground. The ease with which the inner side chain can be pulled tight and the position thereof controlled from a point outside of the tire and fender, contributes considerably to the ease with which the chain can be mounted. Of course, after the inner side chain is fastened, it is a relatively simple matter to pull the extension around and across the tread and fasten the outer side chain and spreader. The provision of a series of links similar to those of the cross links in the extension of the inner side chain contributes to the usefulness and long wear life of the tire chain. While attachment of hook 11 to the large link 17 is preferred, the inner hook, of course, may be fastened to any of the links on the inside which can be readily reached, so that the inner hook need not always be fastened to the large link 17. Also, the large link 17 may be omitted, if desired.

Particularly when the extension of the inner side chain forming the last cross link is locked securely to the outer side chain, as in the manner of Figs. 5, 6 or 7, or any other suitable manner, a strong and useful mounting is assured. Also, when the inner side chain is stretched or tightened by pulling on the extension thereof, a tighter and better fitting final assembly is provided, and the probability of having to adjust the chains after running with them for a while is considerably lessened. The spreader is intended to take up any slack, which might permit the chains to fly out from the tire, and strike any part of the automobile, such as the inside of the fender.

As will be evident, a tire chain constructed in accordance with this invention is particularly adapted to be mounted on a tire which is slipping in mud or snow, or on ice, so that any necessity for moving the automobile to enable the tire chains to be mounted is obviated. Also, the tire chain of this invention may be readily mounted on the tire without the necessity of the user crawling under the automobile to reach the inside hook, or the necessity of jacking up the tire off the ground, to permit the chains to be adequately tightened during mounting. As will further be evident, the tire chain of this invention may be demounted from the tire with equal facility and ease.

Although certain specific embodiments of this invention have been illustrated and described, it will be understood that various other embodiments may exist. For instance, the side chains, cross links, hooks, and spreader may differ in size, style, construction, and other features from those shown. It will also be understood that other embodiments of this invention may exist, and that various changes may be made therein, all without departing from the spirit and scope of this invention.

What is claimed is:

1. In a tire chain having an inner side chain, an outer side chain, and cross links normally extending therebetween, said side chains being formed of flat links and said cross chains being formed of twisted links of a material having a larger cross-section than said flat links, said cross links having a greater resistance to tire wear than said side links, said chain being adapted to be mounted on an automobile tire or the like with said cross links extending transversely around and across the tread of said tire, the improvement which comprises an extension formed at one end of said inner side chain, said extension including a series of links similar to said cross links and attached to the last side chain link of said inner side chain, at least two side chain links attached to the end of said extension cross links, and spreading means attached to the end side link of said extension; means for attaching the opposite end of said inner side chain to the link to which said extension cross links are attached; means for attaching the ends of said outer side chain together, with one of said extension end links in interengaging relation with an outer side chain link; and means for additionally attaching said spreading means to said outer side chain at spaced points.

2. In a tire chain having an inner side chain, an outer side chain, and wear resistant cross links normally extending therebetween, said wear resistant links having a greater resistance to tire wear than said side chain links, said chain being adapted to be mounted on an automobile tire or the like with said cross links extending transversely around and across the tread of said tire, the improvement which comprises an extension formed at one end of said inner side chain and adapted to extend around said tread to form a cross link, said extension including a series of wear resistant links connected to the last side link on said inner side chain, a series of at least two side links connected to the end extension cross link and to a spreader adapted to be connected to said outer side chain; a hook for attaching the opposite end of said inner side chain to said last link; a hook for attaching the ends of said outer side chain together, and to said extension; and means for additionally attaching said spreader to said outer side chain.

3. In a tire chain, the improvement defined in claim 2, wherein said spreading means includes a resilient ring of rubber or the like.

4. In a tire chain, the improvement defined in claim 2, wherein said spreading means includes a coil spring adapted to extend across and to be attached to said outer side chain on the opposite side thereof.

5. In a tire chain, the improvement defined in claim 2, wherein said last link of said inner side chain, to which said extension cross links are attached, is larger than the adjacent links of said inner side chain.

6. In a tire chain, the improvement defined in claim 2, wherein said inner side chain attaching means comprises a hook provided with a movable pin.

7. In a tire chain, the improvement defined in claim 2, wherein said inner side chain attaching means comprises a hook provided with a leaf spring.

8. In a tire chain having an inner side chain, an outer side chain, and wear resistant cross links normally extending therebetween, said wear resistant links having a greater resistance to tire wear than said side chain links, said chain being adapted to be mounted on an automobile tire or the like with said cross links extending transversely around and across the tread of said tire, the improvement which comprises an extension formed at one end of said inner side chain and adapted to extend around said tread to form a cross link, said extension including a series of wear resistant links connected to the last side link on said inner side chain, and a series of at least two side links connected to the end extension cross link; a hook for attaching the opposite end of said inner side chain to said last link; and a hook for attaching the ends of said outer side chain together, and to said extension.

THOMAS M. DINES.

REFERENCES CITED

The following references are of record in the file of this patent:

UNITED STATES PATENTS

| Number | Name | Date |
|---|---|---|
| 1,340,182 | Parker | May 18, 1920 |
| 2,059,100 | Green | Oct. 27, 1936 |
| 2,094,228 | Zook | Sept. 28, 1937 |
| 2,130,293 | Bonforte | Sept. 13, 1938 |
| 2,217,498 | Shepherd | Oct. 8, 1940 |
| 2,275,994 | Ruhkala | Mar. 10, 1942 |
| 2,290,398 | Wellington | July 21, 1942 |